US009157616B2

(12) United States Patent
Stanzione

(10) Patent No.: US 9,157,616 B2
(45) Date of Patent: Oct. 13, 2015

(54) CANDLE HOLDER MOUNT

(76) Inventor: Mary Ann Stanzione, Athens, NY (US)

(*) Notice: Subject to any disclaimer, the term of this patent is extended or adjusted under 35 U.S.C. 154(b) by 611 days.

(21) Appl. No.: 13/169,693

(22) Filed: Jun. 27, 2011

(65) Prior Publication Data

US 2012/0328998 A1 Dec. 27, 2012

(51) Int. Cl.

| | |
|---|---|
| ***B23P 19/04*** | (2006.01) |
| ***F21V 21/08*** | (2006.01) |
| ***F21V 35/00*** | (2006.01) |
| ***F21S 6/00*** | (2006.01) |
| ***F21V 21/02*** | (2006.01) |
| ***F21V 21/06*** | (2006.01) |
| *F21W 121/00* | (2006.01) |

(52) U.S. Cl.

CPC ............. *F21V 21/0824* (2013.01); *F21S 6/001* (2013.01); *F21V 21/02* (2013.01); *F21V 21/06* (2013.01); *F21V 35/00* (2013.01); *F21V 21/0808* (2013.01); *F21V 21/0832* (2013.01); *F21W 2121/004* (2013.01); *Y10T 29/49826* (2015.01)

(58) Field of Classification Search

CPC ....................................................... F21V 21/00
USPC .................. 431/289; D26/11, 128, 9, 142, 23
See application file for complete search history.

(56) References Cited

U.S. PATENT DOCUMENTS

| | | | | |
|---|---|---|---|---|
| 1,347,122 | A * | 7/1920 | Riley | 182/61 |
| 1,456,683 | A * | 5/1923 | Thurnauer | 439/123 |
| 1,721,273 | A * | 7/1929 | Johnson | 362/392 |
| 1,948,144 | A * | 2/1934 | Tregoning | 439/123 |
| 1,976,964 | A * | 10/1934 | Propp | 362/392 |
| 2,053,139 | A * | 9/1936 | Donovan et al. | 362/392 |
| 2,710,912 | A * | 6/1955 | Holm | 362/392 |
| 3,124,031 | A * | 3/1964 | Knohl | 411/418 |
| 3,207,023 | A * | 9/1965 | Knohl | 411/387.3 |
| 3,218,905 | A * | 11/1965 | Reiland | 411/417 |
| 3,471,183 | A * | 10/1969 | Fischer | 52/309.1 |
| 3,517,408 | A * | 6/1970 | Banse | 16/72 |
| 3,664,626 | A * | 5/1972 | Sneller | 248/224.7 |
| D227,798 | S * | 7/1973 | Anderson, Jr. | D26/12 |
| 3,918,888 | A * | 11/1975 | Clarke et al. | 431/297 |
| 4,392,191 | A * | 7/1983 | White, Sr. | 362/392 |
| 4,468,721 | A * | 8/1984 | Vandrilla | 362/392 |
| D320,864 | S * | 10/1991 | Boschetto | D26/73 |
| 5,165,554 | A * | 11/1992 | Schlesinger | 211/51 |
| 5,199,781 | A * | 4/1993 | Sweeny | 362/145 |
| 5,249,108 | A * | 9/1993 | Gary | 362/388 |
| 5,407,164 | A * | 4/1995 | Quinn | 248/316.7 |
| 5,829,869 | A * | 11/1998 | Clegg et al. | 362/392 |
| 6,193,396 | B1 * | 2/2001 | Winger et al. | 362/392 |
| 6,520,661 | B1 * | 2/2003 | Hill | 362/249.14 |
| 6,793,365 | B1 * | 9/2004 | Rieck | 362/162 |
| D507,062 | S * | 7/2005 | Boschetto | D26/9 |
| 7,278,765 | B2 * | 10/2007 | Cooper et al. | 362/392 |
| 7,329,023 | B2 * | 2/2008 | Mast | 362/147 |
| 7,677,753 | B1 * | 3/2010 | Wills | 362/161 |
| 7,766,284 | B2 * | 8/2010 | Boschetto | 248/27.8 |
| 8,074,416 | B2 * | 12/2011 | Andrews | 52/241 |
| 2003/0169522 | A1 * | 9/2003 | Schofield et al. | 359/876 |

(Continued)

*Primary Examiner* — Gregory Huson
*Assistant Examiner* — Martha Becton
(74) *Attorney, Agent, or Firm* — Lee Palmateer Law Office LLC; Lee Palmateer

(57) ABSTRACT

A candle holder mount is provided for holding electrical candle simulations firmly to a window sill of a home without the simulated candle being dragged off the sill by the weight of the electrical cord used to power the simulating device. The candle holder mount is affixable to window sills of various materials either in a permanent or removable fashion.

12 Claims, 16 Drawing Sheets

(56) References Cited

U.S. PATENT DOCUMENTS

| | | | | |
|---|---|---|---|---|
| 2004/0075999 | A1* | 4/2004 | Paquette et al. | 362/152 |
| 2004/0178158 | A1* | 9/2004 | Close | 211/59.3 |
| 2005/0193630 | A1* | 9/2005 | Marshik et al. | 49/181 |
| 2006/0171045 | A1* | 8/2006 | Carnevali | 359/802 |
| 2007/0175654 | A1* | 8/2007 | Keith et al. | 174/135 |
| 2008/0001390 | A1* | 1/2008 | Iverson | 280/848 |
| 2009/0236814 | A1* | 9/2009 | Iverson | 280/154 |
| 2009/0316419 | A1* | 12/2009 | Godfrey et al. | 362/396 |
| 2010/0058683 | A1* | 3/2010 | Bushberger | 52/209 |
| 2010/0277379 | A1* | 11/2010 | Lindackers et al. | 343/713 |

* cited by examiner

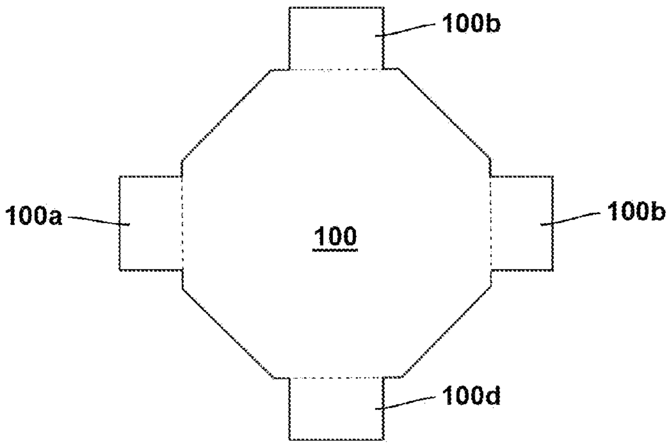
FIG. 14A
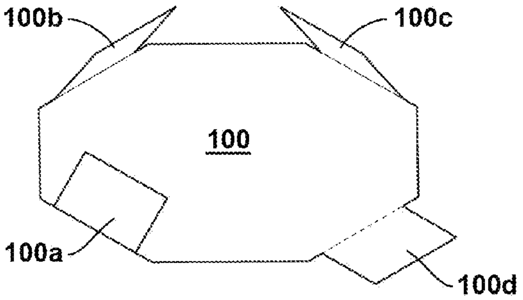
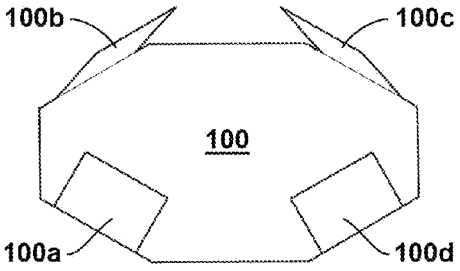
FIG. 14B
FIG. 14C

CANDLE HOLDER MOUNT

TECHNICAL FIELD

The present invention is generally directed to devices for holding candles, methods for manufacturing the device, and methods for using the device.

BACKGROUND OF THE INVENTION

The placement of candles in the windows of homes has been a longstanding tradition. In particular, the Christmas season has typically been a time for home decoration and the placement of candles in one or more windows as a decorative touch. In more recent history, with the use of various window treatments, the danger of fire posed by the use of wax candles, with their attendant flames, has led to the use of electrically simulated candles with decorative light bulbs having a shape intended to imitate the shape of a flame.

These electrical candle simulations typically comprise a base portion and a cylindrical portion affixed to the top of the base portion. An electrical cord is disposed through the base portion so as to feed electrical wires to a standard socket mounted in the top portion of the cylindrical wax-candle-simulating portion. These sockets accommodate bulbs having standard bases to provide a screw-in connection. The electrical cord includes a plug to accommodate a standard A/C wall outlet. In higher end designs, these candle simulators also include an in-line ON/OFF switch.

Accordingly, these candle simulators typically include a base portion intended to simulate a conventional candle holder mount, a cylindrical portion intended to simulate a traditional wax or paraffin candle, and a socket/bulb combination intended to simulate a flame. These candle simulators are intended for placement on the sill of a window. Unfortunately, the candles simulators are provided with electrical cords that extend downwardly in sufficient lengths to cause an unstable situation. In other words, the typical design of such "candles" is such that the weight of the electrical cord tends to pull such candles off of the windowsill. This causes a significant risk of falling, breaking of the bulb and a possible fire or at least some burn damage resulting from the exposure of the incandescent bulb filament. In addition, even without cords, candles placed on windowsills are subject to being easily displaced, toppled and broken by activities such as dusting, or operation of the windows, drapes and blinds.

It is noted that some designs of simulated candles incorporate a battery supply for the light emitting element. However, the batteries do not last long and have to be replaced multiple times in the course of even a short holiday display season. Additionally, one is also left with a battery disposal problem. These candle simulators typically employ an LED (Light Emitting Diode) as the light source. While these sources lack the electrical cord problem, the present invention improves stability of these candle fixtures designs also.

From the above, it is therefore seen that there exists a need in the art to overcome the deficiencies and limitations described herein and above.

Accordingly, it is seen that it is desirable to provide a mechanism for mounting candle devices, particularly those powered from standard A/C outlets, in a window or on another surface so as to prevent them from easily being dislodged.

SUMMARY OF THE INVENTION

The shortcomings of the prior art are overcome and additional advantages are provided via a candle holder mount which comprises a substantially flat base having at least one raised peripheral edge which includes a lip, the top of which extends inwardly, together with means for affixing the base to a flat surface. In one preferred embodiment of the present invention, the candle holder mount comprises a rectangular sheet of cut or stamped aluminum having two adjacent corners cut so that the edges adjacent to these corners may be bent upwardly and inwardly to provide a retaining slot into which an electrical candle simulation may be inserted by a simple sliding action. The base further includes means for affixing the device to a windowsill. The means for affixing are further specified herein below. The candle holder mount of the present invention is mountable on a plurality of surfaces commonly used for windowsills, such as wood, marble and other stone material. The candle holder mount of the present invention also includes embodiments that are permanently attachable and other embodiments that are releasably attachable to the sill or other object. It is to be further noted that the candle holder mount of the present invention may be employed without means for affixation simply by forming it out of a sufficiently massive base, such as brass or similarly weighty material, or forming it so that the base extends laterally, such as in one or more of the length or width dimensions, beyond the peripheral edge so that the base is inherently stable.

Accordingly, it is an object of the present invention to facilitate the placement of electric candles in the windows of houses, especially for seasonal holiday decoration purposes.

It is another object of the present invention to prevent electric candles placed in the windows of various buildings from dislodging and falling.

It is yet another object of the present invention to increase the range of sizes of electric candles that may be deployed in window placements.

It is a still further object of the present invention to provide candle holder mounts having their own decorative form and function for permanent deployment on a variety of windowsills.

It is still another object of the present invention to provide a candle holder mount, as that term is used herein, which is easily and economically manufactured.

It is an even further object of the present invention to provide a candle holder mount which is capable of both permanent and temporary deployment.

In a first aspect, the present invention provides a candle holder mounting device comprising a base with at least one raised peripheral edge defining a lip the top of which extends inwardly, and a means for affixing said base to a flat surface.

In a second aspect, the present invention provides a method of manufacturing a candle holder mounting device comprising cutting corner portions out of two adjacent corners of a substantially flat and substantially rectangular flexible base material, and bending said base material upwardly along the three sides which lie adjacent to said two corners, so as to form an acute angle or angles with said base.

In a third aspect, the present invention provides a candle holder mounting device comprising a substantially flat base having at least one raised peripheral edge defining a lip the top of which extends inwardly, said lip extending a sufficient distance along said peripheral edge to retain a substantially flat object or a portion of an object slidable beneath said lip so as to be retained therein by said lip.

In a fourth aspect, the present invention provides a mounting device for mounting a candle stick holder onto the surface of an object, said device comprising a base, at least one tab upwardly extending from the base for contacting the holder, and at least one element downwardly depending from the base for securing the base to the object.

In a fifth aspect, the present invention provides a method of mounting a candle stick holder to an object comprising: providing a mounting device comprising a base, at least one tab upwardly extending from the base for engaging the holder, and at least one element downwardly depending from the base for engaging the object and securing the mounting device to the object; attaching the mounting device to the object; and placing the holder on the device so that the holder contacts an upward facing surface of the base and contacts the tab.

In a sixth aspect, the present invention provides a candle mounting kit comprising at least one mounting device of the present invention and at least one fastening means, and optionally a candle holder and optionally a candle or simulated candle.

In a seventh aspect, the present invention provides a mounting device for mounting a candle holder onto the surface of an object, said device comprising a base comprising an upwardly facing surface for receiving the bottom surface of a candle holder and at least one bendable portion that can be bent into a position so as to engage a portion of the candle holder. Another variation of this aspect comprises a tab extending from said base so that a candle holder may be placed on the base and the tab may then be bent to engage a lower portion of said candle holder.

In an eighth aspect, the present invention comprises a candle holder comprising a base, an upper portion for holding a candle, and portions which may be either preformed or bendable to conform to a windowsill or sash.

In a ninth aspect, the present invention comprises a candle holder having an integral base with means for attaching the holder to a windowsill or other surface.

Additional features and advantages are realized through the techniques of the present invention. Other embodiments and aspects of the invention are described in detail herein and are considered a part of the claimed invention.

It is to be specifically noted that the recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 14A is a top view of another candle holder mount in accordance with the present invention;

FIGS. 14B and 14C are isometric views of the mount of FIG. 14A showing tabs in different dispositions;

DETAILED DESCRIPTION

Figure 1:
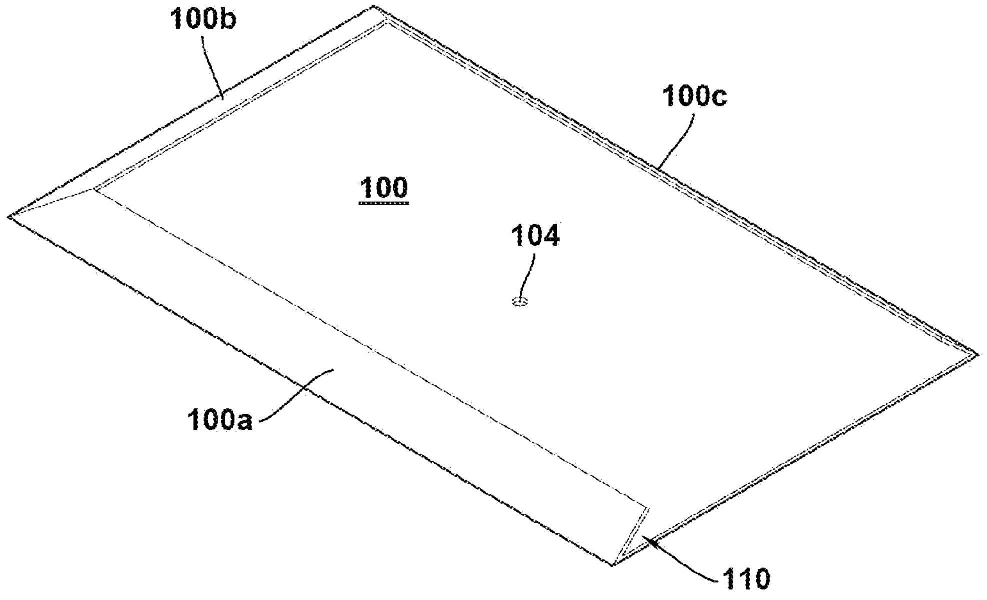
FIG. 1 is an isometric view of a first embodiment of a candle holder mount in accordance with the present invention.
Figure 6:
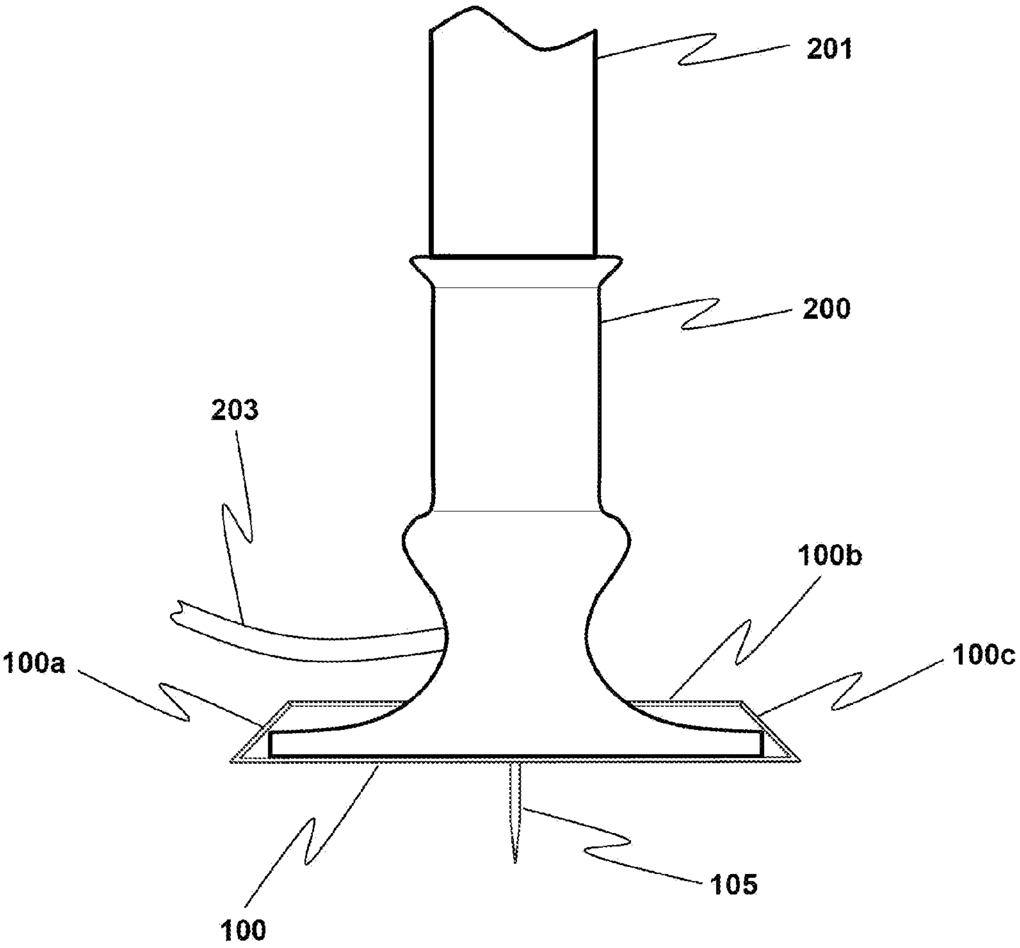
FIG. 6 is a front elevation view illustrating the placement of an electric candle (a simulation) into the a candle holder mount of FIG. 3.

FIG. 1 shows one embodiment of the candle holder mount of the present invention. The mount has a flat base 100 with upwardly extending tabs 100*a*, 100*b*, and 100*c* disposed at acute angles to the base so that the interior surfaces of the tabs face downwardly toward the upwardly facing surface of the base. The tabs in this embodiment are disposed at the peripheral edges of the base, but may be disposed at locations other than the peripheral edge in other embodiments. The embodiment in FIG. 1 is has a quadrilateral base with three peripheral edge tabs and one edge that has no tab, thus forming an "open end." That configuration creates a space 110 into which a bottom portion of a candle holder can enter the open end and be slid into the space defined by the base and tabs, as illustrated in FIG. 6. After the candle holder is assembled to the mount, the candle holder can be easily disassembled by sliding it out in the direction of the open end. The base provides greater stability than the candle holder has on its own. The additional stability may be provided by providing more mass or providing a greater footprint (e.g., greater lateral dimensions) than the candle holder has. Stability may also be provided by permanent or releasable attachment to the windowsill or other object using the various features or means described elsewhere herein with respect to this or other embodiments, such as at least one of a tack, screw, nail, pushpin, bolt, glue, adhesive strip, or Velcro™ hook-and-loop fastener.

Figure 12A:
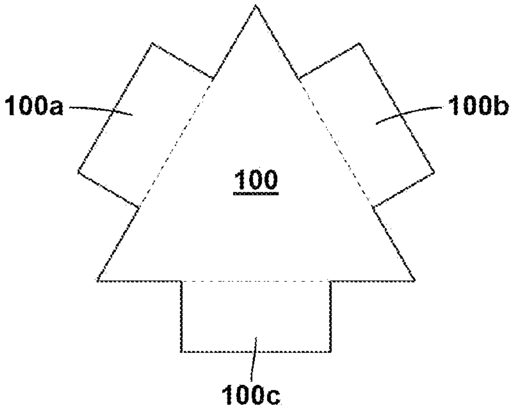
FIG. 12A is a top view of another candle holder mount in accordance with the present invention.
Figure 12D:
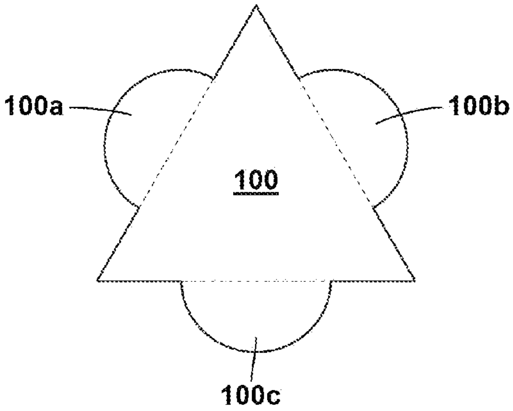
FIG. 12D is a top view of another candle holder mount in accordance with the present invention.
Figure 12B:
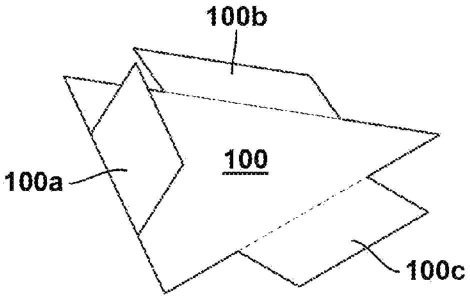
FIGS. 12B and 12C are isometric views of the mount of FIG. 12A showing tabs in different dispositions.
Figure 12C:
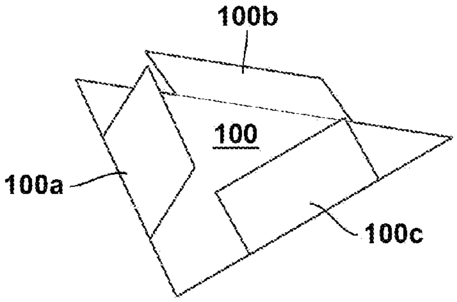
Figure 13A:
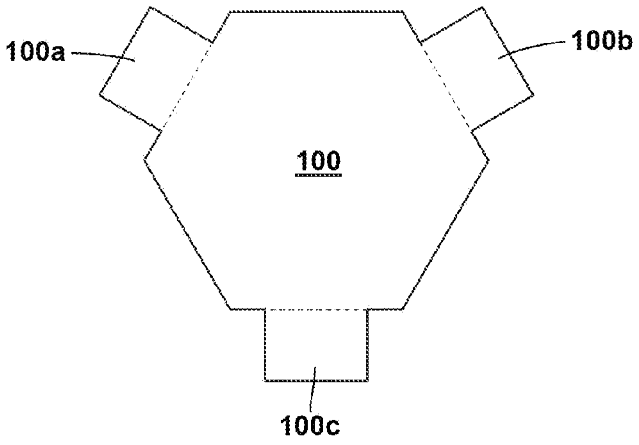
FIG. 13A is a top view of another candle holder mount in accordance with the present invention.
Figure 13B:
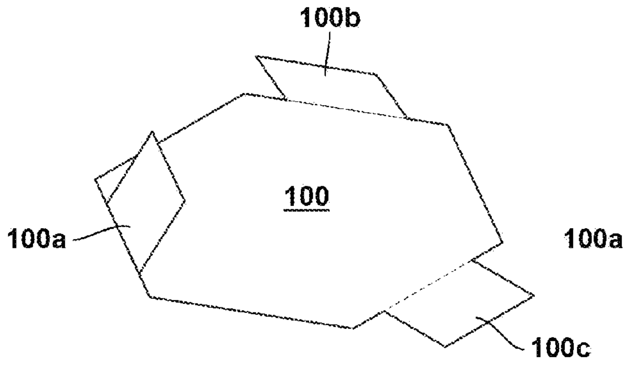
FIGS. 13B and 13C are isometric views of the mount of FIG. 13A showing tabs in different dispositions.
Figure 13C:
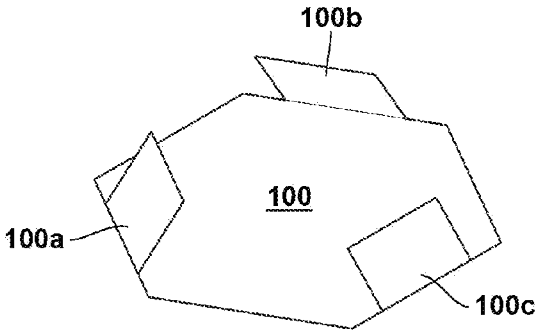
Figure 15A:
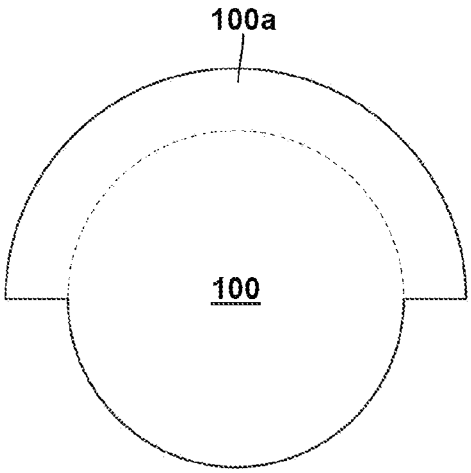
FIG. 15A is a top view of another candle holder mount in accordance with the present invention.
Figure 15B:
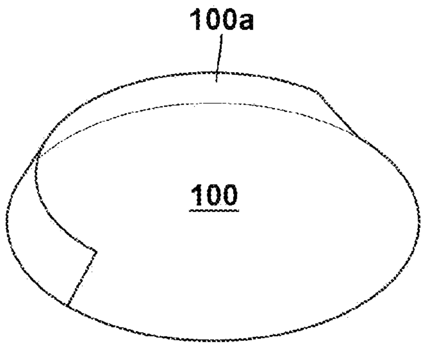
FIG. 15B is an isometric view of the mount of FIG. 15A showing the peripheral edge tab extending upwardly.
Figure 16A:
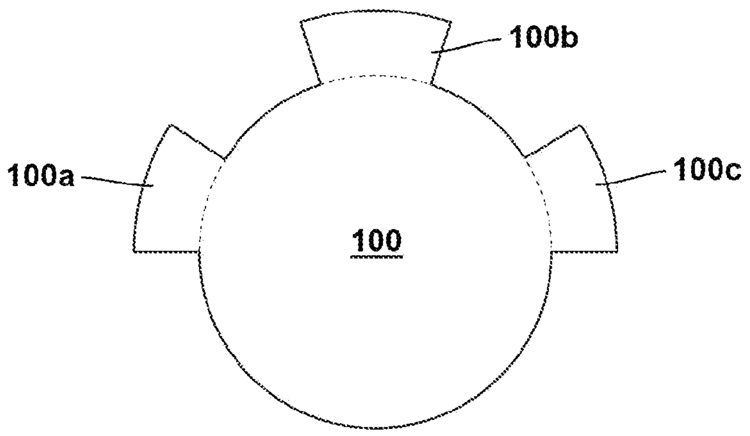
FIG. 16A is a top view a candle holder mount similar to FIG. 15A, but showing a plurality of tabs.
Figure 16B:
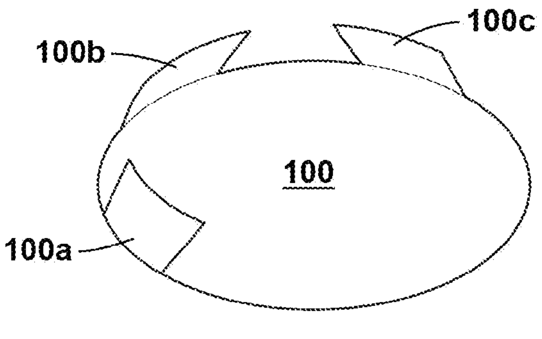
FIG. 16B is an isometric view of the mount of FIG. 16A showing the peripheral edge tab extending upwardly.

While the embodiment of FIG. 1 is rectangular and has tabs that are substantially continuous and coextensive with three peripheral edges of the rectangle, the present invention may have any shape and the peripheral edge tabs may be of any length along the peripheral edge. FIGS. 10, 11, 12A-12D, 13A-13C, 14A-14C, 15A, 15B, 16A and 16B illustrate various such embodiments. There may be any number of tabs along the peripheral edge. While the tabs are illustrated in most of the figures as being strait-edged with sharp corners, the tabs may be any shape, such as rounded as shown in FIG. 12D, contoured or curvilinear in any of the embodiments. The tab in FIG. 15A is shown unbroken, but may comprise notches, such as wedge-shaped notches, where material is removed from the tabs to facilitate bending into final shape.

Figure 2:
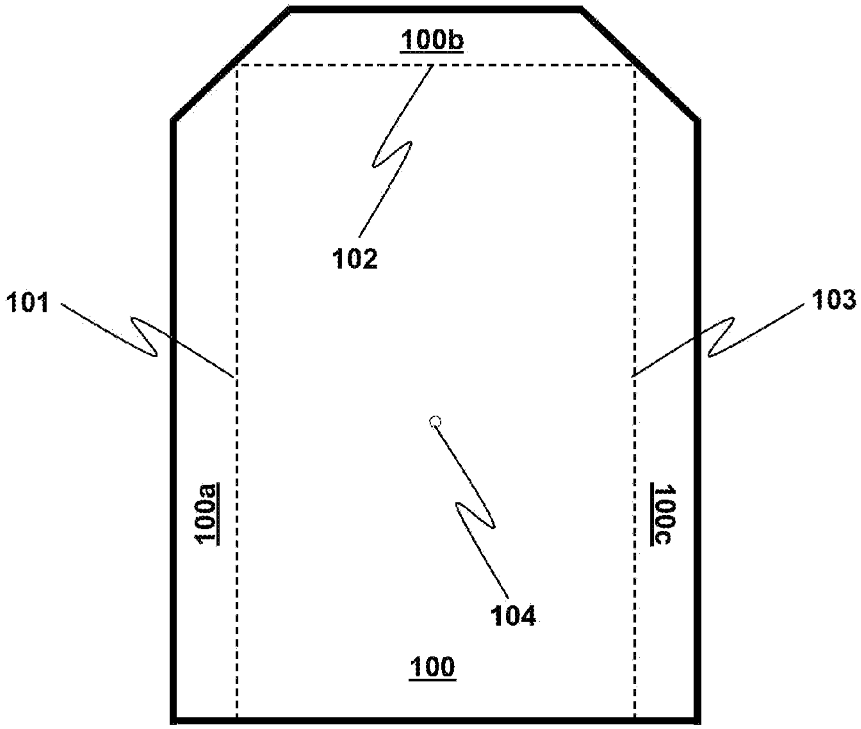
FIG. 2 is a top view of a mount of the present invention in an intermediate state of fabrication prior to its edges being folded to the embodiment of FIG. 1.

One of the embodiments of the candle holder mount of the present invention, together with a method of manufacturing it, are illustrated in FIG. 2. In particular, there is shown substantially flat base 100. In this particular embodiment, base 100 is substantially rectangular. However, it is noted that it could also be triangular, pentagonal or any other convenient shape (for example, as shown in FIGS. 12-16). In the rectangular embodiment illustrated, two adjacent corners may be clipped, substantially as shown. The base material may then be bent along the dotted lines (101, 102 and 103) shown. The folding may continue until sides 110*a*, 100*b* and 100*c* each form acute angles with the remaining portion of base 100 (see FIG. 3). The angles need not be uniform or the same. This folding produces three raised peripheral edges which are capable of accommodating a simulated electric candle (device 250 in FIGS. 4 and 5). Base 100 may also include aperture 104 through which tack 105, nail, pushpin, bolt, screw or similar fastener may be disposed for purposes of affixation to a windowsill or other object. Tack 105, having a substantially flat head, may also be affixed to the base 100, such as to the underside of the base, instead of providing aperture 104. Cutting the corners as shown facilitates the formation of the acute angle or angles mentioned above without any of the bent sides interfering with one another in their ultimately desired position. The embodiment illustrated in FIG. 2 may be made with bendable base materials such as metallic materials including aluminum, copper, bronze and steel that can be bent and hold the bent shape. Any of these materials may also be provided with decorative finishes or include coatings of lacquer, varnish, paint, plastic or the like for aesthetic and protective purposes.

Figure 4:
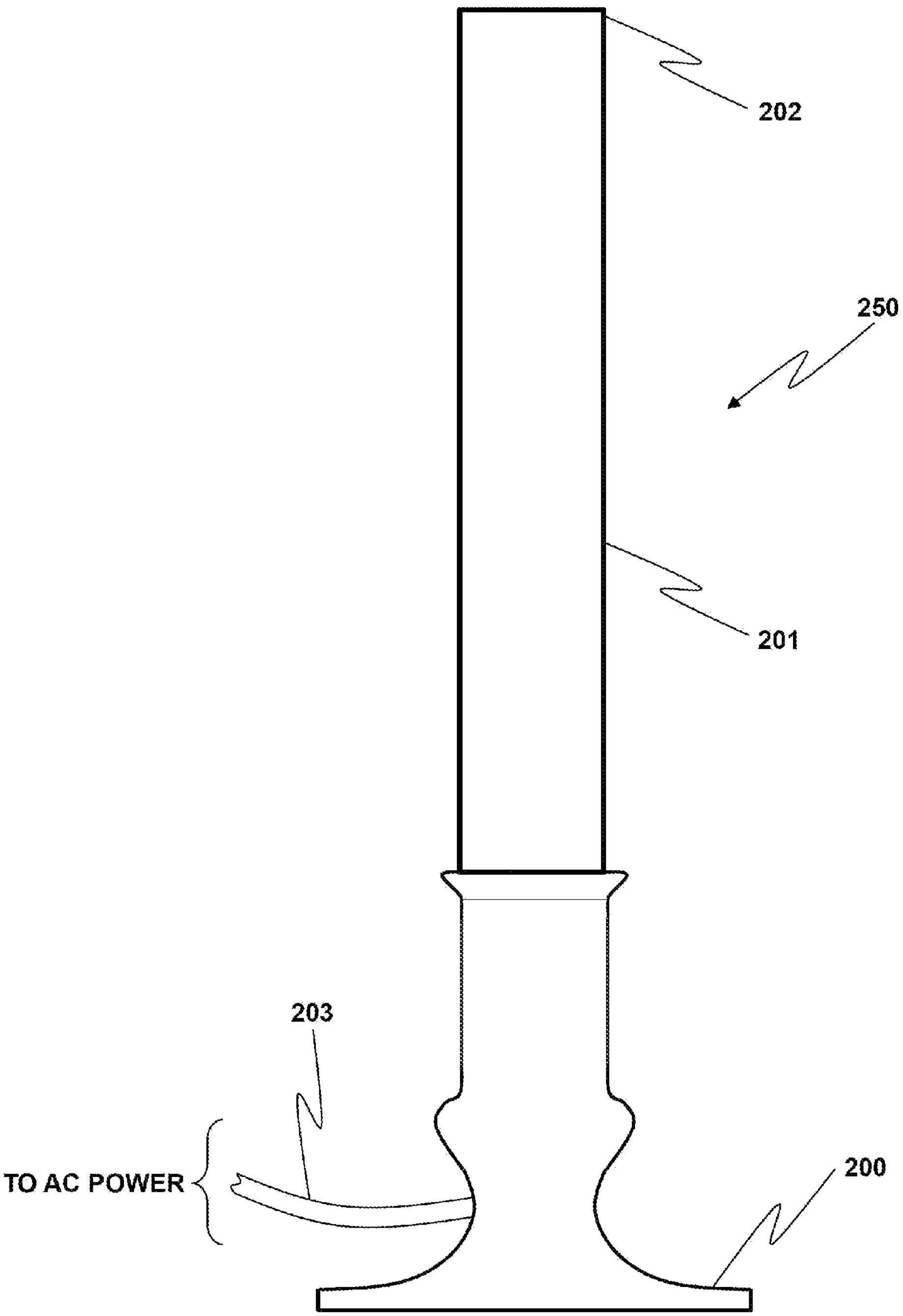
FIG. 4 is a side elevation view of an electric candle intended to simulate a wax or paraffin candle.
Figure 5:
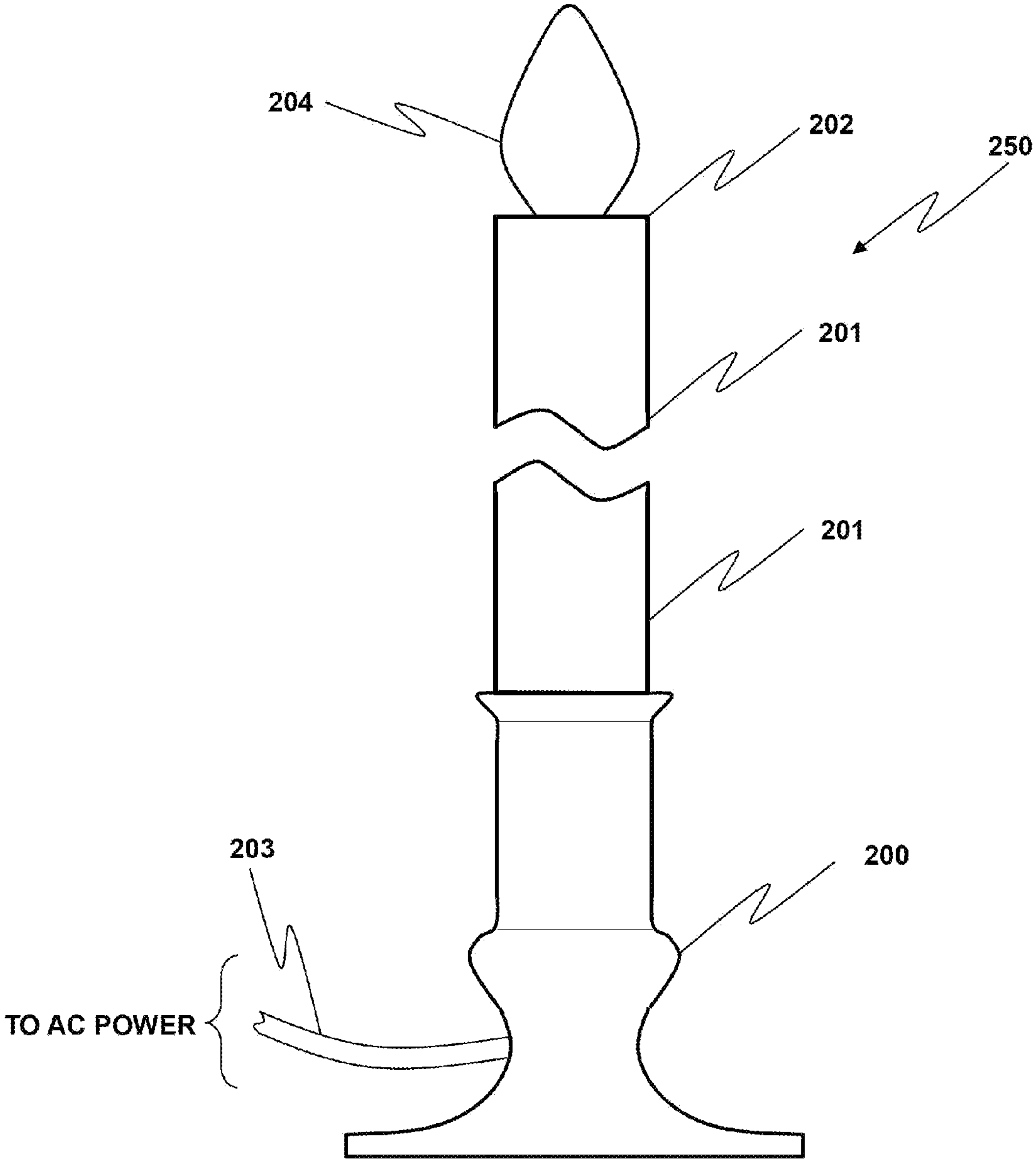
FIG. 5 is a view similar to FIG. 4 but with a conventional incandescent lamp also shown.

In order to provide a better understanding of the present invention, an example of an electric candle device with which it may be used is illustrated in FIG. 4. In particular, electrical candle device 250 comprises its own base 200 through which electrical cord 203 is disposed. In higher end designs of device 250, an in-line power switch may be disposed for the convenience of the user. Furthermore, device 250 comprises a cylindrical portion 201 which is intended to emulate a standard wax or paraffin candle. Cylindrical portion 201 typically possesses a circular cross-section. However, any convenient cross-section may be seen in such devices. Additionally, cylindrical portion 201 is provided, at the top thereof, with an electrical socket which is intended to accommodate a standard, low wattage, Edison-base, screw-in lamp. Such a lamp is illustrated in FIG. 5 and is a designated using reference 204. However, other lamp-to-fixture connections are found in the art, including bayonet designs.

Figure 3:
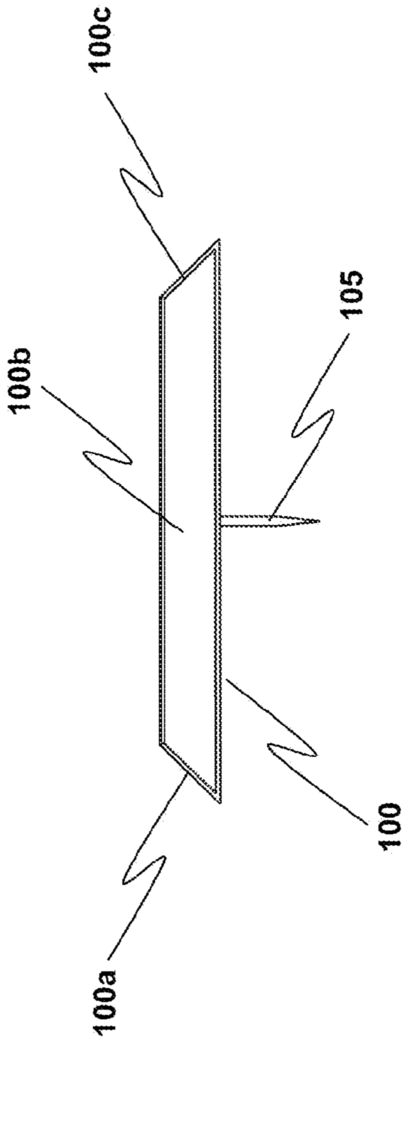
FIG. 3 is a front view of the candle holder mount of FIG. 1 viewed from the open end and further illustrating a fastening means in the form of a nail, tack or pushpin.

FIG. 3 provides an end view of one embodiment of a completely formed candle holder mount of the present invention, with upward extending peripheral edges 100*a*, 100*b* and 100*c*. Open area 110 defined by the downwardly facing surfaces of peripheral edges 100*a*, 100*b* and 100*c* and the upper surface of base 100 is for receiving the bottom portion of an electrical simulated candle 250 such as the one illustrated in FIGS. 4 and 5. An arrangement illustrating the complete insertion is illustrated in FIG. 6, discussed in more detail below. FIG. 3 also illustrates the presence of tack, screw, bolt, nail, pushpin etc. 105 which may be firmly affixed to base 100. The affixing of tack 105 may be provided by an adhesive, by riveting, by force fitting or by spot welding. When completed, as shown in FIG. 3, the candle holder mount of the present invention is press fit into a wooden (or other soft material) windowsill, using tack 105 as a mechanism for holding electric candle device 250. When held by the present invention, the electric candle device is stabilized and prevented from being dislodged by the weight of its own electrical cord or through some other force or disturbance.

Other embodiments have downwardly depending elements that are affixed to or integral with the base and that have the same features as tacks, nails, pushpins and threaded fasteners such as screws and bolts, and which features are operative for attaching the base to the windowsill or other object. Tack, pushpin or nail-like elements engage the windowsill as tacks, pushpins and nails are designed to do. Threaded fastener-like elements engage the windowsill with helical threads threaded into the sill. It is understood that, although application of the mounts of the present invention are described as used on windowsills, they may be used on other objects, such as tables and other furniture and household fixtures.

The present invention also includes a combination of electric simulated candle 250 together with the candle holder mount of the present invention. This combination may also include lamp 204. As above, it is noted that electric candles intended for use with the present invention may include LED devices instead of incandescent bulbs or lamps. FIGS. 4 and 5, while similar, are intended to indicate that either device in these two figures may be combined with and sold with the present invention for use by a homeowner, thus characterizing two forms of combination invention.

Figure 7A:
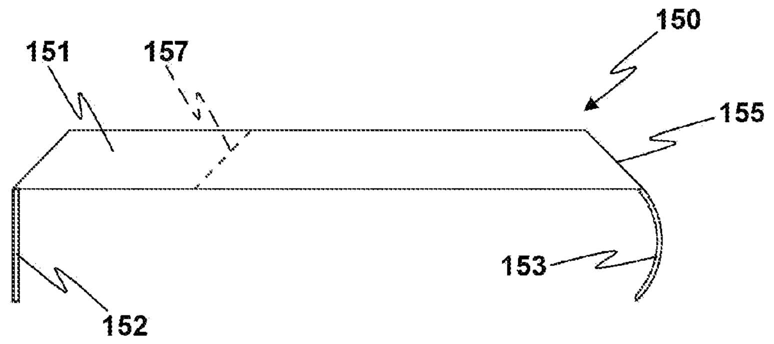
FIG. 7A is another embodiment of a candle holder mount in accordance with the present invention.
Figure 7B:
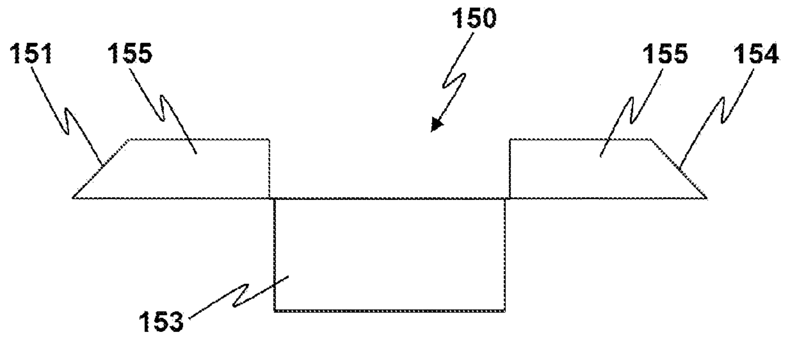
FIG. 7B is a front view of the mount of FIG. 7A.
Figure 7C:
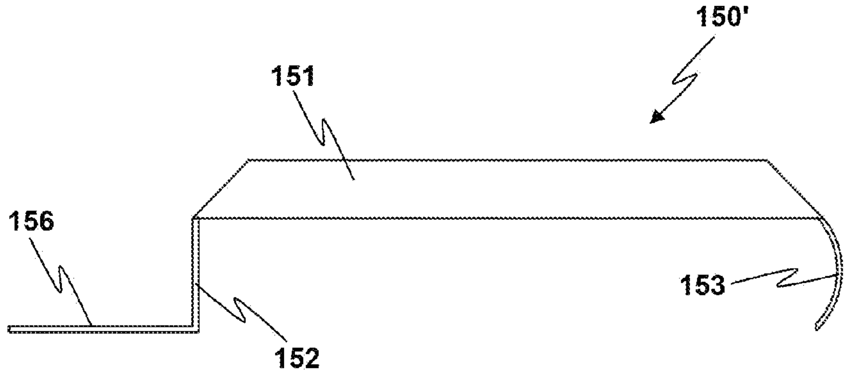
FIG. 7C is a side elevation view of a variation of the candle holder mount of FIG. 7A.

FIG. 6 is a combination of FIG. 3 and either FIG. 4 or FIG. 5. In either case an electric candle simulation is inserted into a candle holder mount of the present invention having base 100 and affixing means, here illustrated by tack 105. Other affixing means are described and discussed elsewhere herein. It is noted that electric candle device 250 may be combined with the present invention in a package ready for sale. In such case, it is only necessary for the user to press the tack into the windowsill in order to hold the combination in place Other embodiments of the present invention are illustrated in FIG. 7. In particular, FIG. 7A illustrates an embodiment having the features of FIG. 1, with additional features in which curved front portion 153 of the invention is intended to hook over the corresponding front portion of a windowsill. Likewise, the candle holder mount of the present invention, in this embodiment, is provided with downwardly extending rear portion 152 which is intended to engage the corresponding back side of a windowsill. In this manner, the device of the present invention is securely and removably held in place without use of means or features that could mar the surface of the windowsill. Edge tabs 151, 154 and 155 in FIGS. 7A-7C correspond to edge tabs 100*c*, 100*a*, and 100*b*, respectively, in FIG. 2. The present invention may be provided in a number of different sizes and shapes corresponding to various windowsill sizes and shapes. While the illustrated embodiments are shown with front and rear portions, other embodiments may have only one or the other. Additionally, dotted line 157 in FIG. 7A-7C indicates that the upwardly extending sides or tabs of base 100 may be of any length and are not required to extend for the full length of any particular peripheral edge of the base.

In addition, although portions 152 and 153 are shown extending in a downward direction proximal to the location where the upwardly extending tabs 151 and 154 meet the base, it is understood that portions 152 and 153 may have portions proximal to that location that extend laterally outward from that location before a more distal portion takes a downward shape. Another way to describe the same variation of this embodiment is that the base extends outwardly beyond the location where the tabs extend upward, and portions 152 and 153 extend downwardly from the base at a location that is laterally outward from the tabs.

FIG. 7B is a front facing view of the device shown in FIG. 7A. Curved front portion 153 may, but does not necessarily extend fully across the front of the device as illustrated in FIG. 7B. It may be placed at any convenient location. It may even be provided at one or more locations. Portion 153 may be formed as part of the same cutting and bending operation that may be used to manufacture the device illustrated in FIGS. 1, 2, 3, and 6. In this embodiment, it is desirable that base 100 comprises a sufficiently thin material that it may easily be inserted between a slidable window sash and the back of a windowsill.

FIG. 7C illustrates a variation on the device shown in FIGS. 7A and 7B. In particular, this embodiment further comprises edge 156 that extends in a rearward direction from the bottom of flange or peripheral edge 152. In this particular embodiment, flange 156 is configured so that its upward facing surface engages the bottom of a slidable window sash so as to more firmly hold the device of the present invention in place.

Another embodiment of the present invention is a candle holder mount that has a base with sufficient material to engage the window sill in similar fashion as the above embodiments illustrated in FIG. 7A-7C, but that does not have preformed portions 152 and 153. In this embodiment, the base may be substantially flat. This embodiment may be put into application by providing a mount in an unbent condition, then placing the base on the window sill and then bending the base material, such as by hand or common household tools, so that it engages a front portion of the window sill and/or a back portion of the window sill, in the same way as described above. The bendable portions of the base are easily bendable. They may be easily bendable by hand. They may also be bendable using typical household tools. This embodiment is capable of being bent to conform to the shape of the window sill. This embodiment may also use bendable tabs extending from the base that are bendable to engage the window sill. In this embodiment, a tab may be a piece of material extending from the base in the same manner as the tabs illustrated in FIGS. 10 through 13. The base or tabs are bendable back towards their original position so as to release the mounting device from the window sill. In addition to or instead of being bent at the proximal portion of the tab where it meets the base, the tabs can be bent anywhere between said proximal portion to its distal portion furthest away from the base, thus making the mounting device capable of mounting to window sills or other objects of a range of sizes and shapes. The foregoing assembly and disassembly process may be repeated as needed to engage and release the mount from the window sill.

Figure 17:
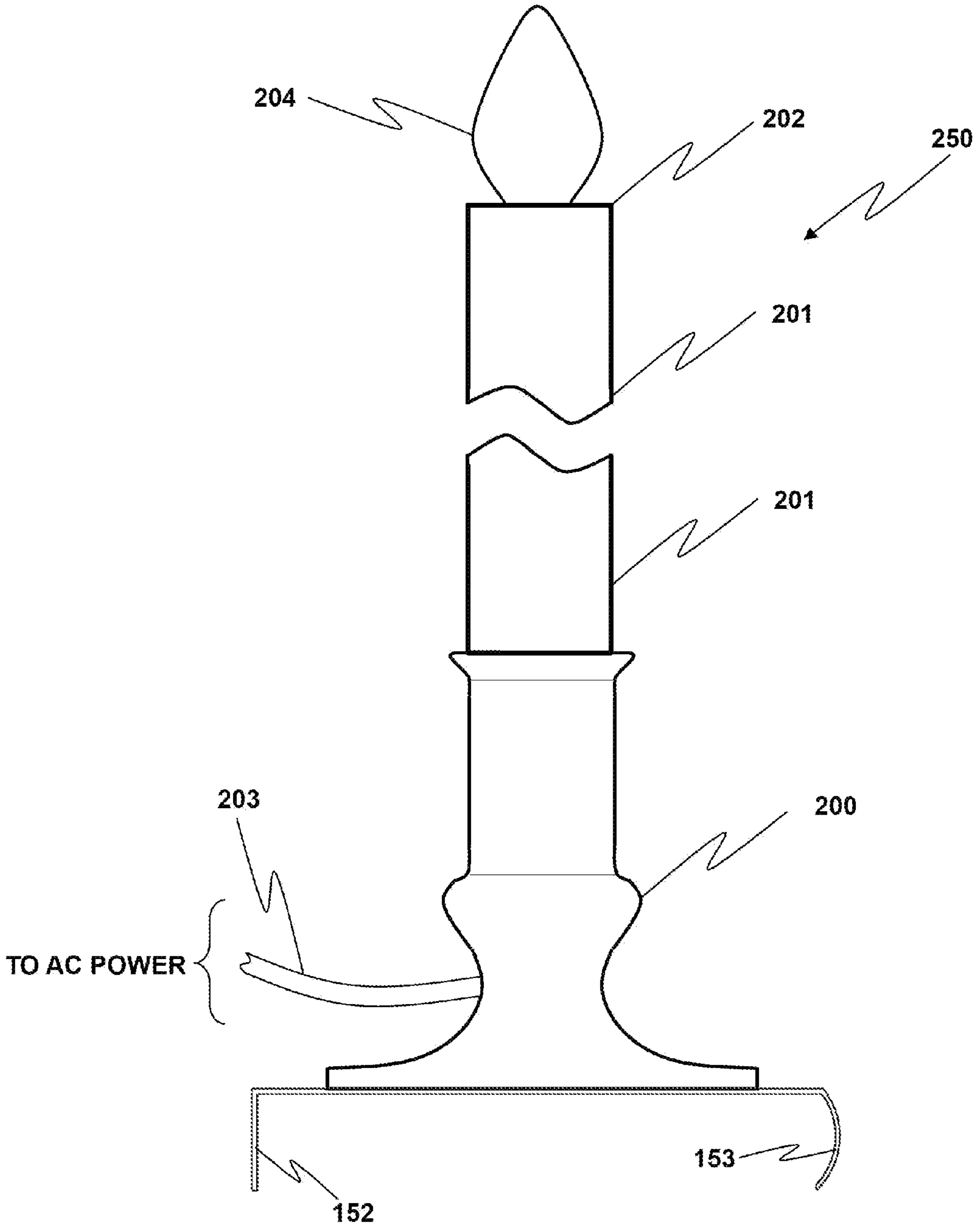
FIG. 17 is an isometric view of another embodiment of a candle holder mount in accordance with the present invention.

FIG. 17 illustrates one variation of another embodiment of the present invention that comprises a candle holder integral with a mount having any of the attachments means described herein. The attachment means may be the means of the embodiment shown in FIG. 7A and may be any of the other means described herein with respect to the other embodiments. Integral candle holder portion 200 extends upward from the base 100, which portion 200 may be configured in the shape of any traditional candle holder and may be of any shape. Variations of this embodiment comprise a candle holder portion extending upward from any of the other embodiments described herein, but does not require any features or means for engaging a candle holder because the holder portion is integral to the mount.

Figure 8B:
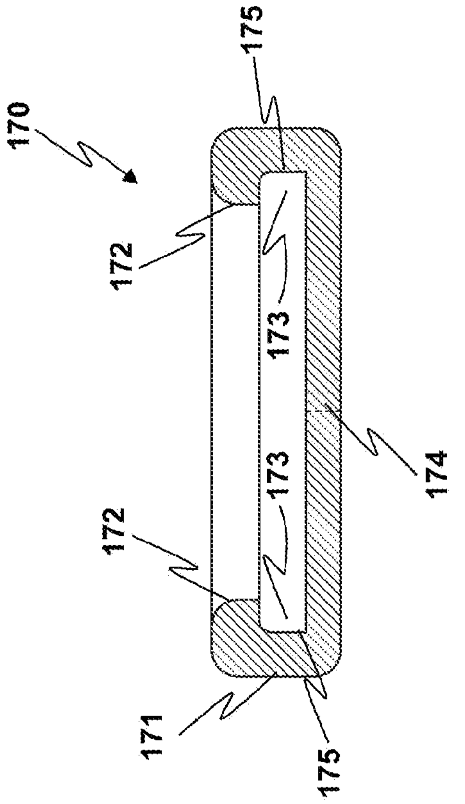
FIG. 8B is cross sectional view of the mount of FIG. 8A along the line 8B-8B.
Figure 8A:
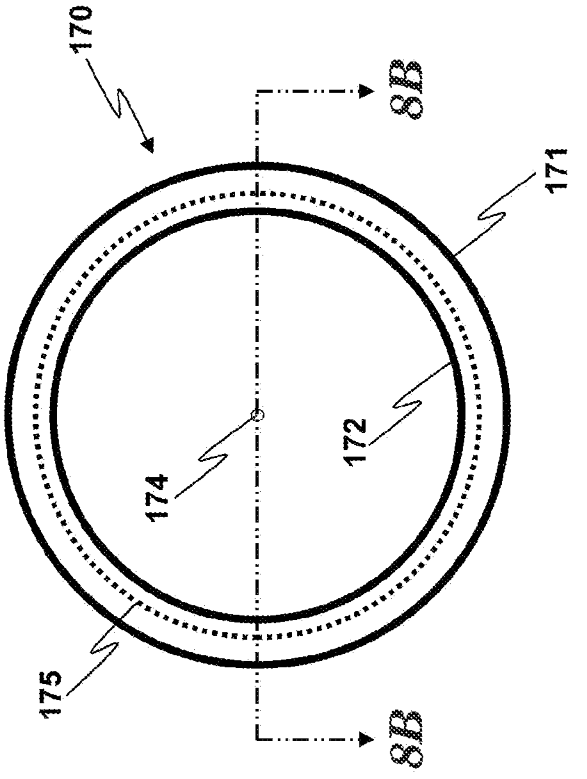
FIG. 8A is a top view of another embodiment of a candle holder mount in accordance with the present invention.

A desirable aspect of the present invention is that it includes a base having a periphery which possesses an upper lip structure which extends inwardly from the periphery of the base. This lip extension is selected to be of a sufficient size so as to accommodate base structure 200 of simulated candle 250. In this manner simulated candle 250 may either be slid into the candle holder mount of the present invention or popped in. In the embodiments of the present invention illustrated in FIGS. 1, 2, 3 and 6, the desired means of insertion is via a sliding motion. However, in other embodiments of the present invention such as in FIGS. 8A and 8B, it is also alternately desirable to size the structure relative to base structure 200 so as to permit insertion by means of simply clicking (pushing, forcing) electric candle simulation 250 into place. In this embodiment, it is preferable that the mount be made with plastic, acrylic and/or other polymeric materials. In such cases, base 100 of the present invention may take on a circular form such as that shown in FIG. 8A. Here it is desirable that the shape of base 170 possess substantially the same shape as structure 200 of electric candle 250. Such a device is illustrated in FIG. 8A. Here device 170 may also include aperture 174. More particularly, device 170 possesses periphery 171 together with an inwardly extending lip 172 at the top portion of periphery 171. This defines relatively small recess 173 (see FIG. 8B) into which an edge of base structure 200 may be inserted. Recess 173 includes inner wall 175 which is also referred to in FIG. 8A.

Other embodiments of the present invention, variations of which are shown in FIGS. 10 through 17, have base 100 with bendable portions, such as portions at the peripheral edges of the base, which can be bent to engage a portion of the candle holder. The bendable portions may comprise tabs 100*a*-100*d* extending from the base. The tabs are easily bendable. They may be easily bendable by hand. They may also be bendable using typical household tools. Another variation of this embodiment is in the same shape as that shown in FIG. 2, in which case the tab is coextensive with the periphery of the base. It is understood that, while the corner cuts of FIG. 2 are desirable, they are not necessary. These embodiments may be put into application by providing mount in an unbent condition, then placing the candle holder on the base of the mount, then folding the tabs up using your fingers or tool of choice, such as pliers, so that at least one tab engages a lower portion of the candle holder. The tabs are bendable back towards their original position so as to release the candle holder. In addition to or instead of being bent at the proximal portion of the tab were it meets the base, the tabs can be bent anywhere between said proximal portion to its distal portion furthest away from the base, thus making the mounting device capable of mounting candle holders or other objects of a range of sizes and shapes. The foregoing assembly and disassembly process may be repeated as needed to engage and release a candle holder. The mount may be attached to the windowsill using any of the means discussed herein, either before or after the above process of assembling the holder to the mount. While the tabs are illustrated in the figures as being strait-edged with sharp corners, the tabs may be of any shape, such as rounded, contoured or curvilinear. For example, the outer periphery of tabs 100*a*, 100*b*, and 100*c* in FIGS. 12A-12C that comprise three sides forming two angles may instead have a rounded shape, such as a hemispherical shape, as shown in FIG. 12D, so as to eliminate sharp corners, or a curvilinear or contoured shape.

Figure 9:
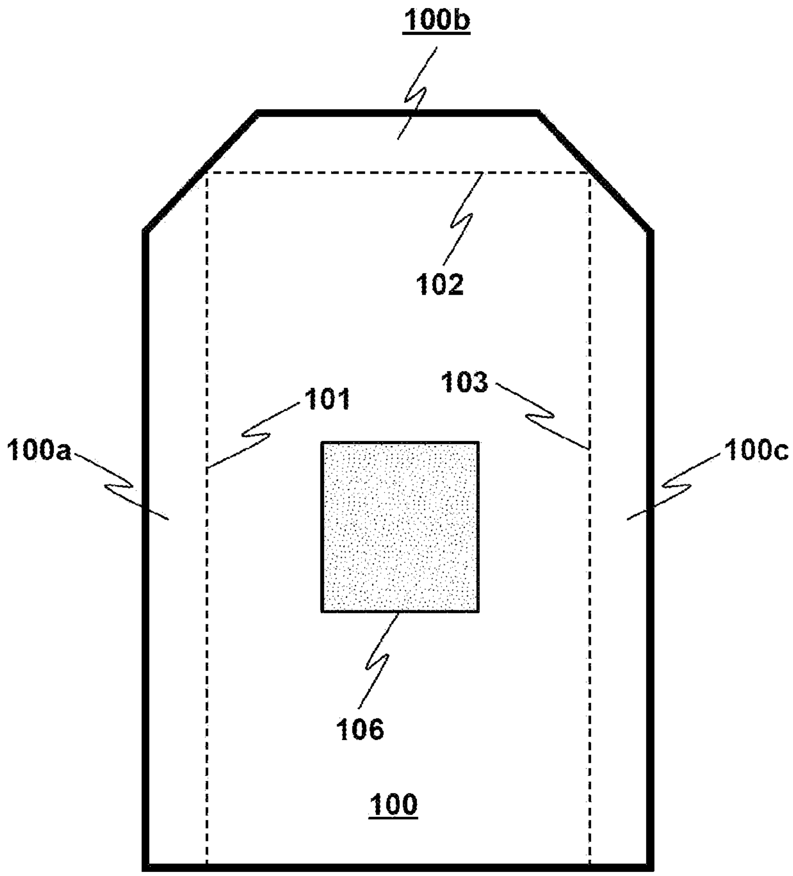
FIG. 9 is a bottom view of the mount of FIG. 2 showing an alternate fastening means.
Figure 10:
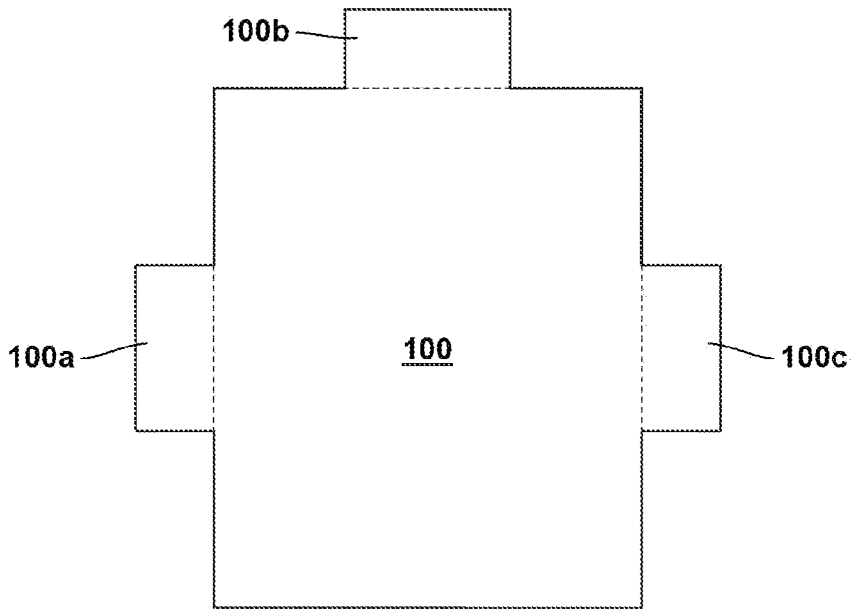
FIG. 10 is a top view of another embodiment of a candle holder mount in accordance with the present invention, similar to FIG. 2, but showing tabs that are less than coextensive with the sides of the base.
Figure 11:
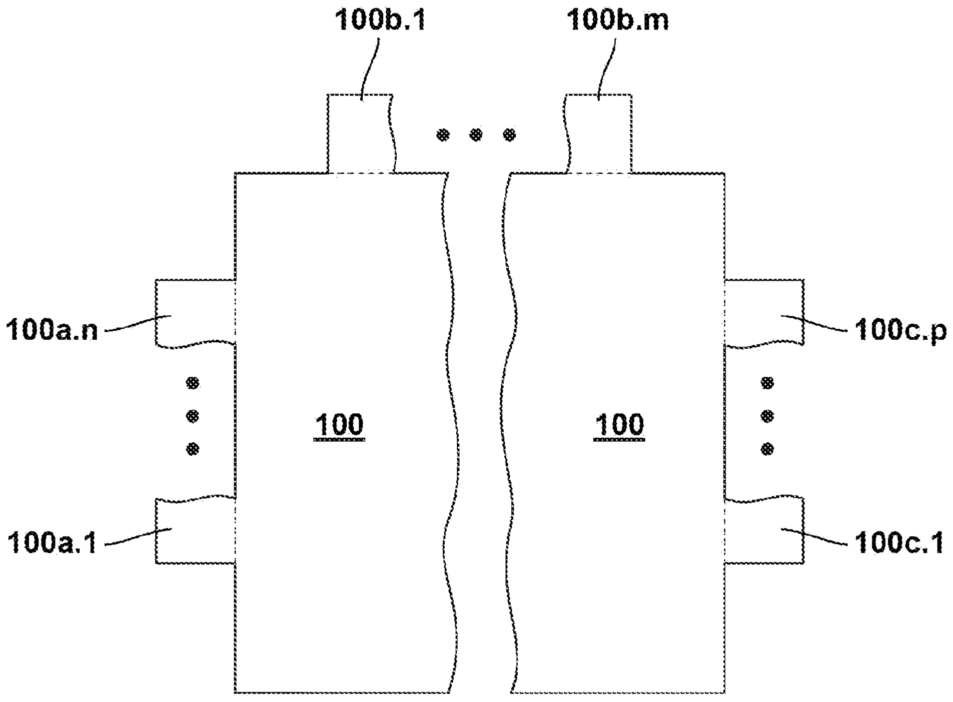
FIG. 11 is a top view of another embodiment of a candle holder mount in accordance with the present invention, similar to FIG. 10, but showing an indeterminate number and size of tabs.

In those circumstances where it is not desired to mar or damage the surface of a windowsill, alternate means of affixation may be provided. As shown in FIG. 9, adhesive strip 106 may be provided on the bottom of base 100. The affixation means may also include a matched pair of Velcro™ strips, one affixed to base 100 and the other affixed to the desired windowsill or other object.

As discussed above, the candle holder mount of the present invention may be affixed to a windowsill via a variety of mechanisms. These include a nail, tack, pushpin or other pointed instrumentality for insertion into a wooden windowsill. The present invention may also be provided with a hole for attachment by screw or bolt. Additionally, one may also employ a singly or doubly sided adhesive strip or tape to hold the base to the windowsill. A pair of correspondingly matching Velcro™ fasteners are also employable.

The base of the present invention may comprise any material and may comprise a plurality of materials. These materials include, but are not limited to metal, plastic and even wood. If the base material comprises a bendable metal such as steel or aluminum of sufficiently small thickness, the present invention is preferably manufactured by a cutting and bending process. If the base is of a metal which is easily cast in the desired shape, then a metal casting process may be appropriate. A molding process may be used for any materials that a moldable. If the base comprises wood, then a cutting and shaping mode of manufacture may be most appropriate. Many materials and manufacturing processes are known in the art to be suitable for the present invention.

Any workable metals may be used in the manufacture of the present invention, such as aluminum, pewter, copper, brass, iron, bronze and steel. Aluminum, steel, copper and brass are some of the easier metals to use in the formation of the candle holder mount of the present invention via cutting and bending operations. These metals are also more easily provided in an originally shaped work piece by metal stamping operations.

The terms "front," "back," "top," "bottom," "rear," "side" and the like are used herein in a relative fashion. The candle holder mount of the claimed invention is nonetheless intended to be covered by these recitations even if the device itself is held or displayed in any orientation whatsoever. These recitations, nonetheless, make the claims more readable and understandable.

Reference characters may be repeated to identify analogous features in several different embodiments.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A candle holder mount for use in securing a candle holder on an object having a flat surface of sufficient size to accommodate the bottom of the candle holder, said candle holder mount comprising:

a substantially flat base comprising an upwardly facing surface for slidably receiving the candle holder thereupon in a sideways sliding motion and at least one raised peripheral edge portion defining a lip for slideably receiving portions of the candle holder beneath said lip;

said lip having a downwardly facing surface extending inwardly at an upward angle defining a tapered space between said downwardly facing surface and the upwardly facing surface of said base; and said lip extending a distance along the peripheral edge of said base that is shorter than the entire distance along the periphery of said base and defining an open end of the base along which said lip does not extend so as to allow the candle holder to be inserted onto the upwardly facing surface from the open end in a sideways sliding motion and slid across said surface into the tapered space for releasable assembly with the base and allow the candle holder to be disassembled from the base by sideways sliding motion a sufficient distance to move said portions of the candle holder out from beneath the lip;

said downwardly facing surface engageable with an upper peripheral edge of the candle holder so that said candle holder is disposed inwardly from the peripheral edge of said substantially flat base; and means for affixing said base to said flat surface of the object.

2. The candle holder mount of claim 1 wherein said base comprises an opening in said base for receiving a tack shaft therethrough and said affixing means comprises a tack disposed through said opening, the sides of said opening extending sufficiently around the tack shaft so as to secure the tack shaft within the opening in all lateral directions.

3. The candle holder mount of claim 1 wherein said affixing means comprises a tack affixed to said base.

4. The candle holder mount of claim 1 wherein said affixing means comprises an adhesive strip, a hook-and-loop fastener, a bolt, or a screw.

5. The candle holder mount of claim 1 wherein said affixing means comprises a front portion extending downwardly from said base and a back portion extending downwardly from said base, whereby said candle holder mount is maintained in place by contact of said portions with corresponding front and back portions of a windowsill.

6. The candle holder mount of claim 1 wherein said affixing means comprises a front portion of said base extending downwardly from said base and configured so as to engage a corresponding front portion of a windowsill.

7. The candle holder mount of claim 1 in wherein said affixing means comprises a back portion of said base extending downwardly from said base and configured so as to engage a corresponding back portion of a windowsill.

8. A candle holder mount for use in securing a candle holder on a flat surface of an object, said candle holder mount comprising:

a substantially flat base having at least one raised peripheral edge defining a lip along a portion of the periphery of said base;

said lip having an inwardly extending surface rising up from and disposed on an acute angle to an upward facing surface of said base;

said inwardly extending surface and said upward facing surface defining a tapered space beneath said inwardly extending surface;

said inwardly extending surface engageable with an upper peripheral edge of the candle holder; and said lip extending a sufficient distance along said peripheral edge to define an open end of the base along which said lip does not extend so as to allow the candle holder to be inserted onto the upwardly facing surface from the open end in a sideways sliding motion and slid across said surface into the tapered space for releasable assembly with the base and allow the candle holder to be disassembled from the base by sideways sliding motion a sufficient distance to move said portions of the candle holder out from beneath the lip.

9. The candle holder mount of claim 1 further comprising a candle holder adapted for mounting to said base.

10. The candle holder mount of claim 1 where said base is round and said lip extends about halfway around said base.

11. A candle holder mount of claim 8 further comprising a candle holder adapted for mounting to said base.

12. The candle holder mount of claim 8 where said base is round and said lip extends about halfway around said base.

* * * * *